(12) United States Patent
Couse (10) Patent No.: US 8,842,152 B2
(45) Date of Patent: Sep. 23, 2014

(54) COLLABORATION APPLIANCE AND METHODS THEREOF

(75) Inventor: Peter Francis Couse, Ottawa (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 200 days.

(21) Appl. No.: 13/068,170

(22) Filed: May 3, 2011

(65) Prior Publication Data
US 2012/0281057 A1    Nov. 8, 2012

(51) Int. Cl.
*H04N 7/14* (2006.01)

(52) U.S. Cl.
USPC .......................................... 348/14.01; 381/92

(58) Field of Classification Search
USPC ........................................ 348/14.01–14.09
See application file for complete search history.

(56) References Cited

U.S. PATENT DOCUMENTS

| | | | |
|---|---|---|---|
| 6,173,059 B1 * | 1/2001 | Huang et al. | ..................... 381/92 |
| 7,428,000 B2 * | 9/2008 | Cutler et al. | ................ 348/14.11 |
| 2004/0004942 A1 | 1/2004 | Nebiker et al. | |
| 2007/0171273 A1 | 7/2007 | Saleh et al. | |
| 2010/0066804 A1 | 3/2010 | Shoemake et al. | |
| 2010/0315481 A1 | 12/2010 | Wijngaarden et al. | |
| 2011/0234746 A1 * | 9/2011 | Saleh et al. | ................. 348/14.03 |
| 2011/0279640 A1 * | 11/2011 | Choi | .......................... 348/14.12 |
| 2012/0081503 A1 * | 4/2012 | Leow et al. | ................. 348/14.07 |

FOREIGN PATENT DOCUMENTS

WO    WO 02/37848 A1    5/2002

\* cited by examiner

*Primary Examiner* — Maria El-Zoobi (57) ABSTRACT

Generally described, the present disclosure relates to electronic devices. More specifically, the disclosure relates to a collaboration appliance and methods thereof. In one illustrative embodiment, the collaboration appliance can provide an all-in-one conference room solution having numerous functions and features. The collaboration appliance can incorporate a beam forming microphone array and speaker for high quality audio conferencing, a built-in display capability that supports two different displays, one being an external high resolution monitor or projector connected via a high-definition multimedia interface, the other being a built-in liquid crystal display that has a touch overlay for navigation and application invocation. Built-in support for multi-party high definition video conferencing can be provided.

18 Claims, 9 Drawing Sheets

COLLABORATION APPLIANCE AND METHODS THEREOF

COPYRIGHT NOTICE

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

TECHNICAL FIELD

This disclosure generally relates to collaborative meetings, and more particularly, to an all-in-one conference room solution that supports high quality conference phone calls, presentation displays via a high-definition multimedia interface and native multi-party video conferencing.

BACKGROUND

In businesses, conference room solutions require a conference phone and a laptop connected with a projector or monitor for providing a presentation. The typical setup is to have a call initiated on the conference phone plus the laptop connected to a video cable that drives the projector or monitor. A local area network cable connection is required for the laptop to gain network access. One drawback is that these cables are left lying on the table top causing clutter and must be passed around the room from one laptop to another if the presenter of the material in the room needs to change. In addition, the display configuration on the laptop often needs to be manipulated to get the output to display correctly on the projector or monitor in the room due to different maximum resolutions supported on the projector or monitor relative to the resolution that is setup on the laptop.

Users today are opting for other computing devices instead of a laptop for carrying their information. These devices include tablet computers or smartphones. Often, however, these types of individuals who are making a presentation are unable to do so because the monitor cable provided in the room is of the wrong type. The user must then rely on another meeting participant with a laptop and provide the presentation material via a universal serial bus stick or email so that it can be transferred to the laptop for display. Challenges occur when the meeting evolves, however, as it is often necessary for the presenter to present materials that were not intended to be shown. To overcome this, files must be transferred again to the laptop that is being used to display the presentation material. Traditionally, this has added complexity and reduced efficiency.

Video conferencing solutions are also becoming more popular in meeting rooms as companies look for ways to enable collaboration between geographically dispersed teams while minimizing travel costs. These video conferencing solutions are often separate from the conference phone, laptop and projector or monitor solution in the meeting room and typically provide their own computing platform and monitor. Because the system is separate, the presentation material being displayed in the meeting room is not integrated with the video conferencing display, diminishing the value that the video adds in terms of collaboration effectiveness. Video conferencing solutions also typically require their own separate networking and management infrastructure from the rest of the IP environment. Generally, setting up a meeting that includes presentation display, plus audio or video conferencing can be complex and time consuming.

An emerging solution that attempts to address these issues is known as a telecollaboration solution. These systems provide high quality audio and video conferencing capabilities as well as the ability to remotely access and share a user's desktop computer with other participants in a conference. The systems support multiple high resolution monitors for display of video and presentation material. Nevertheless, the costs of these telecollaboration solutions can be in the tens of thousands of dollars. Because of the steep cost, they are not widely deployed within an organization being primarily limited to one or two meeting rooms. This limits user accessibility and diminishes its usefulness in terms of enabling collaboration between users in different geographic locations. These systems can also be complex and difficult for a user to get going. This is compounded by the fact that users of a conference room are in-frequent users and therefore do not benefit from repeated frequent use to aid them learning how to use the solution.

A system and method is therefore needed to enable collaboration within meeting rooms of an organization. At the same time, a cost efficient solution should be provided. These, as well as other related advantages and features, will be described in the present disclosure.

BRIEF DESCRIPTION OF DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings, wherein:

DESCRIPTION OF THE DISCLOSURE

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

Generally described, the present disclosure relates to electronic devices. More specifically, the disclosure relates to a collaboration appliance and methods thereof. In one illustrative embodiment, the collaboration appliance can provide an all-in-one conference room solution having numerous functions and features. The collaboration appliance can incorporate a beam forming microphone array and speaker for high quality audio conferencing, a built-in display capability that supports two different displays, one being an external high resolution monitor or projector connected via a high-definition multimedia interface (HDMI), the other being a built-in liquid crystal display (LCD) monitor that can have a touch overlay for navigation and application invocation. Built-in support for multi-party high definition video conferencing, for example, 1080p, can also be provided.

Applications such as the Microsoft Office Suite™ or non-Microsoft® applications that enable displaying and editing of Microsoft Office files can be incorporated. These applications can enable material to be displayed on the monitor or projector connected to the collaboration appliance via the HDMI interface. Additional applications can be provided such as a file browser, web browser, portable document format (PDF) reader and a remote desktop client that allows a user of the collaboration appliance to access their desktop PC remotely from the meeting room and display material that resides on that PC in the meeting room on the HDMI connected monitor or projector. Support for multiple file transfer methods, including accessing a corporate local area network (LAN) from the collaboration appliance to upload a file resident on a network connected drive can be provided. In addition, file transfers can be provided by plugging in a universal serial bus (USB) flash drive, secure digital (SD) card or using Bluetooth™ or other wireless method to transfer a file from a tablet PC, smartphone or laptop.

Numerous advantages can be offered by the illustrative embodiment described above. The collaboration appliance can reduce the amount of time and effort associated with setting up a meeting in a conference room. Furthermore, a laptop is no longer required to display a presentation. The collaboration appliance can also have the ability to display presentation materials on a permanently connected projector or monitor. In addition, the collaboration appliance can have the ability to set up a multi-party video conference and display it on the same projector or monitor. Superior audio conferencing capabilities including a beam forming microphone array and speaker that provides the same conferencing capability as a high end conference phone are also provided.

Many additional advantages of the present disclosure will become apparent to those skilled in the relevant art as provided for in the following description.

Figure 4:
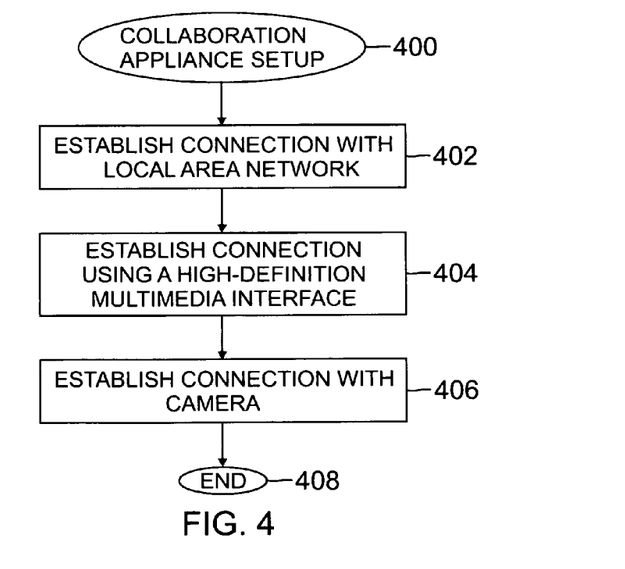
FIG. 4 is a flow chart illustrating processes for setting up the collaboration appliance in accordance with one aspect of the present disclosure.
Figure 5:
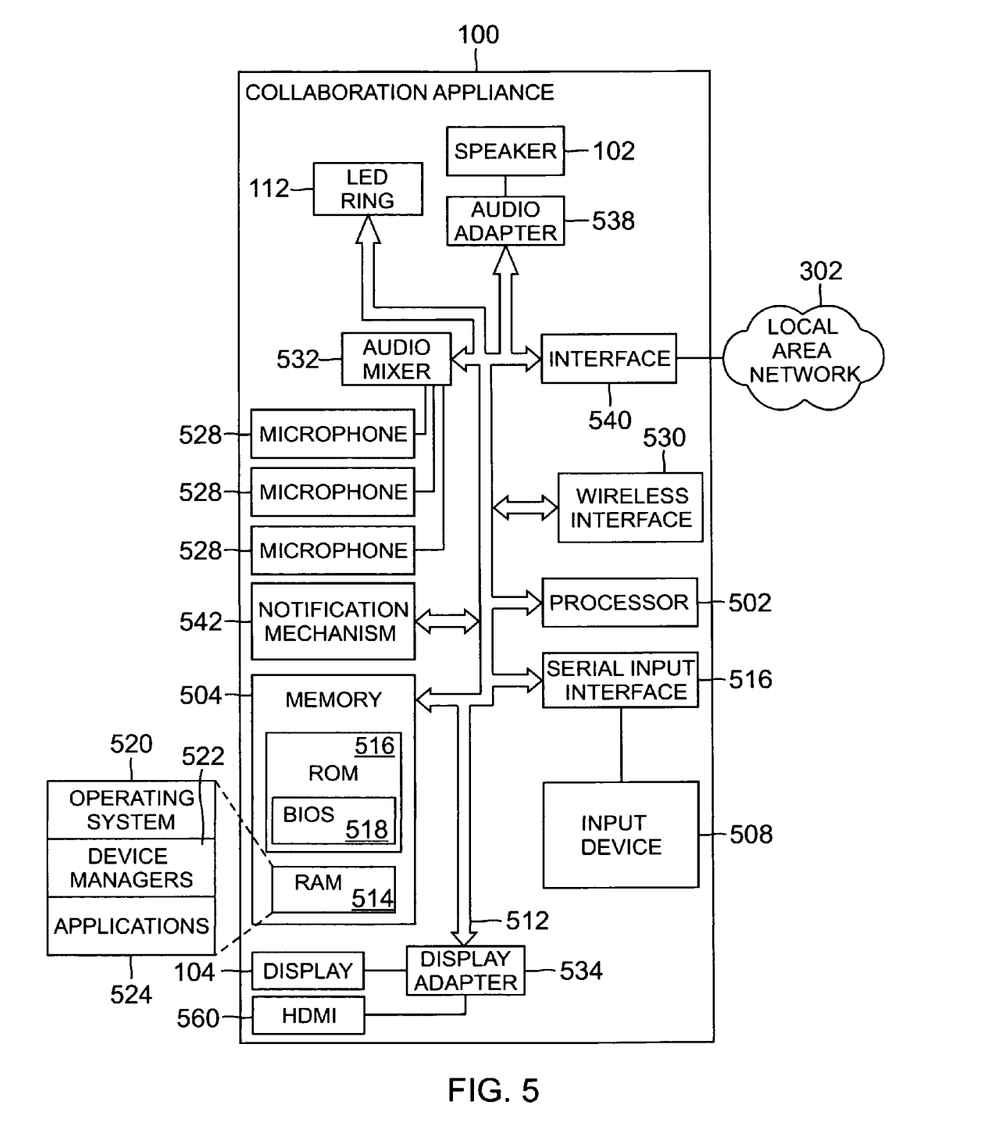
FIG. 5 is a block diagram showing illustrative hardware and software components of the collaboration appliance in accordance with one aspect of the present disclosure.

Before describing embodiments of the present disclosure, an exemplary collaboration appliance for handling multi-party conference calls will be described in FIGS. 1 and 2A through 2C and an operating environment for the collaboration appliance will be provided in FIG. 3. FIG. 4 provides illustrative processes for setting up the collaboration appliance. Following, FIG. 5 shows exemplary software and hardware for the collaboration appliance. FIGS. 6 through 9 provide applications for use within the collaboration appliance.

The technology described herein can be implemented as logical operations and/or modules in the collaboration appliance 100. The logical operations can be implemented as a sequence of processor-implemented steps executing in one or more computer systems and as interconnected machine or circuit modules within one or more computer systems. Likewise, the descriptions of various component modules can be provided in terms of operations executed or effected by the modules. The resulting implementation is a matter of choice, dependent on the performance requirements of the underlying environment in which the described disclosure is implemented. The logical operations making up the embodiment of the disclosure described herein are referred to variously as operations, steps, objects, or modules. It should be understood that logical operations can be performed in any order, unless explicitly claimed otherwise or a specific order is inherently necessitated by the claim language.

Figures 1, 2A:
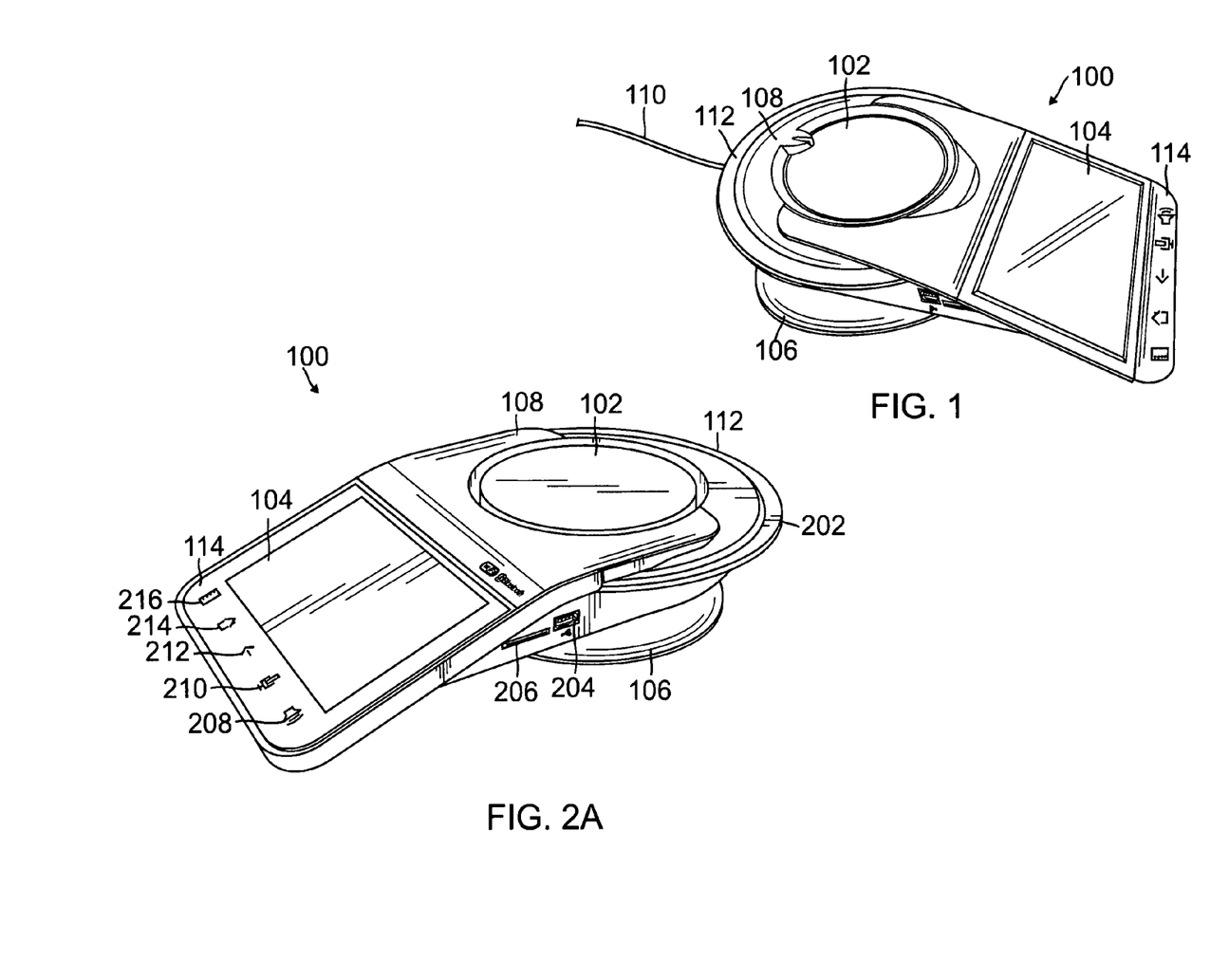
FIG. 1 is an exemplary embodiment of a collaboration appliance in accordance with one aspect of the present disclosure.
FIG. 2A is an alternative view of the collaboration appliance in accordance with one aspect of the present disclosure.

Turning now to FIG. 1, an exemplary embodiment of a collaboration appliance 100 in accordance with one aspect of the present disclosure is provided. While being described as primarily a collaboration appliance 100, those skilled in the relevant art will appreciate that it can also be referred to as an apparatus or device and further be called a conference phone or the like. The collaboration appliance 100 can fill a void in conference room solutions between audio only conference units and expensive telecollaboration systems. By providing a collaboration appliance 100 with much of the same value as a telecollaboration system that approaches the cost of a high end audio conferencing phone, the collaboration appliance 100 can be much more widely deployed enabling meeting room based collaboration to be much more ubiquitous within an organization.

Generally, the collaboration appliance 100 can include a speaker 102, a display 104, a base 106 and a speaker encloser and microphone array housing 108. The collaboration appliance 100 can include fewer or more components. The collaboration appliance 100 typically includes a single high quality speaker 102. The speaker 102 can be positioned at the center of the collaboration appliance 100 facing up. In one embodiment, the speaker 102 can provide 22 KHz audio playback support in addition to wideband telephony audio.

The speaker encloser and microphone array housing 108 of the collaboration appliance 100 can be coupled to a base 106. The base 106 can provide a sturdy support for the speaker 102 and the display 104, while reducing the large number of wires that are associated with typical meeting room presentation and teleconferencing systems. In one embodiment, the display 104 can be positioned on the collaboration appliance 100 such that a top portion of the display 104 starts at the speaker encloser and microphone array housing 108 and a bottom portion of the display 104 is slanted towards a surface the collaboration appliance 100 is resting on. In another embodiment, the display 104 can be positioned on the collaboration appliance 100 such that a bottom portion of the display 104 has two feet that rest on the table top and provide support for the display 104. The feet can be designed such that the underside of the display area stands at a distance from the tabletop so as not to block sound from reaching the beam-forming microphones. The top portion of the display 104 can end at the speaker enclosure and microphone array housing 108 near the speaker 102. By providing the display 104 at an angle, the display 104 can be seen while the user is in a seated position.

The display 104 can be a color multi-touch LCD that provides a graphical user interface (GUI) for the collaboration appliance 100. In one embodiment, the internal display 104 can measure at seven inches diagonally. A HDMI type A interface can provide the ability to drive an external high resolution projector or monitor in the room. A video camera, keyboard or flash drive can be connected through a USB connection, which will be described in further details below.

An Ethernet cord 110 can be plugged into the collaboration appliance 100. The Ethernet cord 110 can be plugged into a single gigabit Ethernet LAN port. Power for the collaboration appliance can be supplied over the Ethernet cord in a standard 802.3af "Power Over Ethernet" manner. In one embodiment, the single Ethernet cord 110 can be used to receive and transmit audio and video to the collaboration appliance 100. The Ethernet cord 110 can also provide other relevant data to the collaboration appliance 100. Other types of connections including wireless connections can be used and are not limited to the Ethernet cord 110 described above.

A number of microphones can also be provided within the collaboration appliance 100. While not shown in FIG. 1, the audio receivers form a three hundred and sixty degree array around the collaboration appliance speaker encloser and microphone array housing 108. The microphone array can provide beam forming capabilities. Around the speaker 102 can be provided a light emitting diode (LED) ring 112. The LED ring has a number of LEDs corresponding to the microphone audio beams such that the LED ring 112 would light when audio is received. As provided for in FIG. 2A, a lighted portion 202 on the LED ring 112 would turn on when audio is detected from that direction. The lighted portion 202 can indicate where user audio is currently being picked up from i.e. indicating which audio beam is currently active.

In one embodiment, multiple lighted portions 202 can be activated when multiple parties are speaking. Typically, however, the lighted portion 202 focuses on one specific user, often the party speaking the loudest. The LED ring 112 can light in a particular pattern and color to indicate call states such as an incoming call, call on hold, etc. The LED ring 112 function can also extend to a complete circle by utilizing the internal LCD display to mimic a LED being illuminated within the GUI on the display such that the lighted portion 202 can point to any user that surrounds the collaboration appliance 100. The LED ring 112 can be raised above the speaker encloser and microphone array housing 108 in one embodiment.

A feature toolbar 114 can also be provided. In FIG. 2A, the feature toolbar 114 shows a number of different options that can be accessed with the touch of a button. For example, a Menu option 216 can be accessed whereby a variety of functions can be received. A home option 214 can be provided that returns the user to a home screen. The home screen, in one embodiment, can provide access to different features and acts as the starting point when the collaboration appliance 100 is turned on.

A Back option 212 can be provided to a user so that the user can move to the previous screen in the GUI, presentation, document, etc. A Mute option 210 can also be provided within the feature toolbar 114, which Mutes the microphones during a conference call. In one embodiment, the feature toolbar 114 can have a volume option 208. The volume option 208 can allow a user to lower or raise the volume depending on the needs of the conference. For example, the volume can be raised to its highest level if the conference takes place in a large room.

As described earlier, the collaboration appliance 100 can retrieve presentations, documents, etc. from a variety of sources. In one embodiment, a card reader 206 can be provided. The card reader 206 can read memory cards that store digital information, which are commonly used in many electronic devices such as digital cameras, mobile phones, laptop computers, MP3 players and video game consoles. Numerous types of memory cards are available and the card reader 206 can be programmed to be compatible with these cards.

In addition, a USB port 204 can be provided. The USB port 204 can establish communications between a number of different devices. In one embodiment, these devices can be memory devices such that presentations, documents, etc. can be retrieved therefrom. In addition, the USB port 204 can be used to attach a video camera or other external device for receiving video. More than one card reader 206 or USB port 204 can be provided within the collaboration appliance 100. The USB port 204 can also be attached to a printer for printing documents provided on the collaboration appliance 100.

Figure 2B:
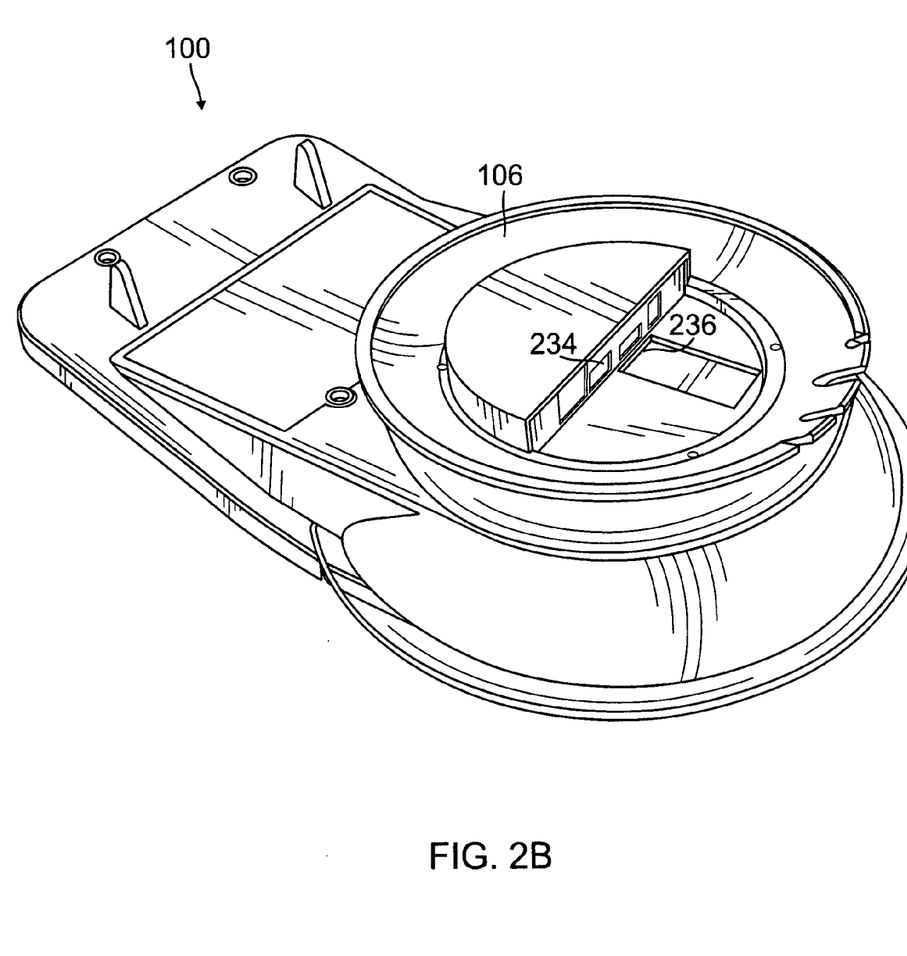
FIG. 2B is an upside down view of the collaboration appliance in accordance with one aspect of the present disclosure.

Known to those skilled in the relevant art, a number of devices can be connected to the USB port 204. Furthermore, other types of connections, besides the USB port 204, can be used. While inserted into the side of the collaboration appliance 100, both the card reader 206 and the USB port 204 can be located elsewhere on the collaboration appliance 100. For example, another card reader 234 or USB port 236 can be provided on the bottom portion of the collaboration appliance 100 as depicted in FIG. 2B, which is an upside down view of the collaboration appliance 100 in accordance with one aspect of the present disclosure.

Figure 2C:
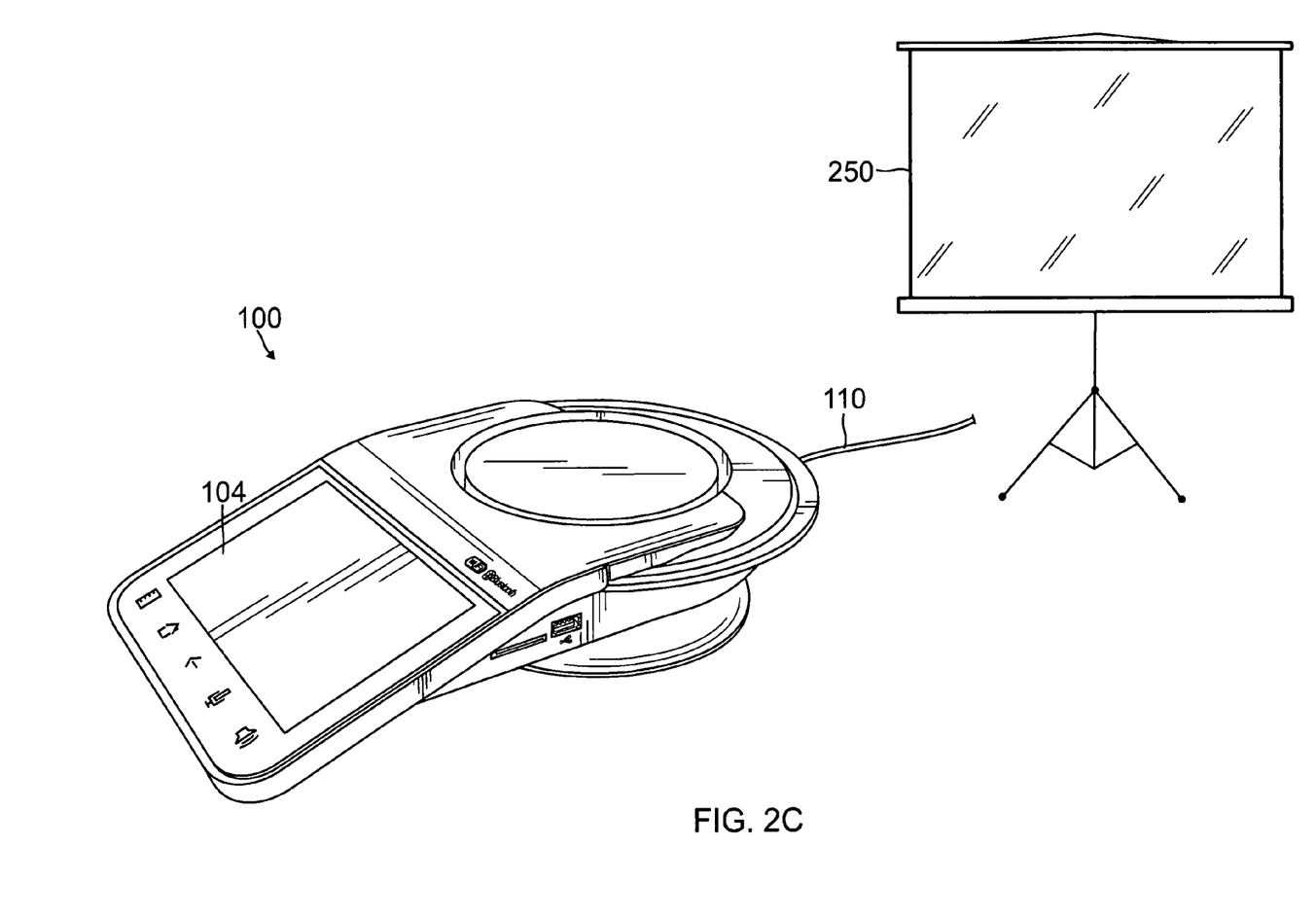
FIG. 2C is a view of the collaboration appliance with a connected projector or monitor in accordance with one aspect of the present disclosure.

FIG. 2C is a view of the collaboration appliance 100 with a connected projector or monitor 250 in accordance with one aspect of the present disclosure. The collaboration appliance 100 can provide a built-in display capability. In one embodiment, a built-in LCD monitor 104 that has a touch overlay for navigation and application invocation can be provided. An external high resolution projector or monitor 250 connected via a HDMI port can also be used.

The projector or monitor 250 can receive video and presentation feeds through the single HDMI cord 110. In one embodiment, the information can be provided wirelessly, wireline connection or through some other method. Those skilled in the relevant art will appreciate that there numerous implementations for providing the information to the projector or monitor 250. Furthermore, the projector or monitor 250 can also work in tandem with the display 104 of the collaboration appliance 100. For example, the display 104 can be used for manipulating audio and video feeds provided to the projector or monitor 250. In one embodiment, the display 104 can also show the same audio and video provided on the projector or monitor 250.

The collaboration appliance 100 can provide the ability to display presentation materials on the external projector or monitor 250. The presentation materials can be retrieved through the USB port 204, card reader 206, wirelessly, through the Ethernet cord 110, etc. Typically, the presentations use an application opened and executed on the collaboration appliance 100. While the use of presentations has been described, any data file that contains audio or video can be used.

The collaboration appliance 100 can provide audio and video from a number of different sources to the display 104 and/or to the external projector or monitor 250, which can include embedded pre-recorded audio and video. In one embodiment, local live audio and video received by the collaboration appliance 100 can be combined with live audio and video from remote devices. This live audio and video can also be combined with the prerecorded presentation audio and video. The combined audio or video can be taken from any of the sources described above and does not necessarily include each source. For example, through the collaboration appliance 100, the live audio and video from the collaboration appliance 100 is combined with pre-recorded audio and video from the presentation. The audio and video can then be provided to the remote devices without retransmitting audio and video from the remote devices.

The combined audio can be provided to the speaker 102 of the collaboration appliance 100. The audio can also be provided to the remote devices or an external speaker that can be associated with the projector or monitor 250. The combined video can be provided to the projector or monitor 250. In addition, the video can be provided to the display 104 or provided to the remote devices. The presentation materials along with video windows can be provided through the HDMI connector to the projector or monitor 250. The collaboration appliance 100 provides the ability to replace the mixed video sent to remote devices with the presentation being displayed on the HDMI connected projector or monitor 250. Typically, the presentation is sent as video so it appears within the remote devices video window in place of the mixed camera feed.

Figure 3:
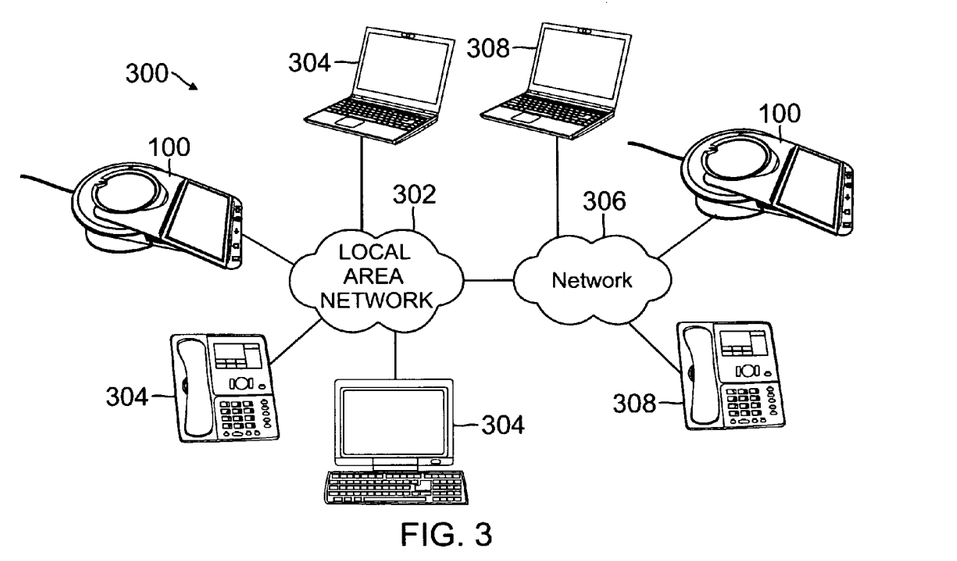
FIG. 3 is a typical environment in which the collaboration appliance can be used in accordance with one aspect of the present disclosure.

Referring to FIG. 3, a typical environment 300 in which the collaboration appliance 100 can be used in accordance with one aspect of the present disclosure is provided. The collaboration appliance 100 can be used to establish a teleconference with numerous other devices that can be directly or indirectly connected. The collaboration appliance 100 can be connected to a LAN 302 through the Ethernet cord 110. In one embodiment, the collaboration appliance 100 can be connected to another type of network such as a wide area network, personal area network, campus area network, metropolitan area network, global area network or the Internet. Alternately, the collaboration appliance can connect to the LAN via a Wireless interface such as an 802.11 WiFi interface.

The collaboration appliance 100 can communicate with other devices 304 that are directly coupled to the LAN 302, such as a high definition video camera, laptop computer, IP phone or desktop computer, to name a few. In one embodiment, the LAN 302 can be coupled to a network 306. These networks 306 can include many types of networks as described above. The collaboration appliance 100 can communicate with other devices 308 through the LAN 302 and then the network 306. In one embodiment, the collaboration appliance 100 can communicate with another collaboration appliance 100, either directly or indirectly as shown. Those skilled in the relevant art will appreciate that numerous other devices can be connected through a number of different connections and are not limited to those shown in the environment 300 of FIG. 3.

FIG. 4 depicts a flow chart illustrating processes for setting up the collaboration appliance 100 in accordance with one aspect of the present disclosure. The processes can begin at block 400. At block 402, the collaboration appliance 100 can establish a connection with the local area network 302. Generally, the collaboration appliance 100 can be a plug-and-play system such that it can be setup without the need for a physical device configuration, or user intervention in resolving resource conflicts.

At block 404, the collaboration appliance 100 can establish a connection using an HDMI port. Through the HDMI port, the collaboration appliance 100 can receive and provide audio and video streams. A video camera can then be attached to the collaboration appliance 100 at block 406. In one embodiment, the video camera can be permanently fixed on the collaboration appliance 100. Alternatively, the video camera can be removable. The setup processes can end at block 408.

Before describing specific applications, the hardware and software of the collaboration appliance 100 will now be described. Generally, the collaboration appliance 100, as shown in FIG. 5, can have a processor 502 for implementing logic, memory 504, the display 104 described earlier, and an input device 508. A system bus 512 can be used for video and audio data as well as propagating signals for processing the video and audio. Fewer or more components can be used within the collaboration appliance 100 known to those skilled in the relevant art.

Beginning with the input device 508, a push button numeric dialing pad can be used, for example, those found on a typical telephone. The numeric dialing pad, which is commonly known, can include digits "0" through "9" along with letters of the English alphabet. A multi-key keyboard can also be used. Other types of input devices 508 can be used as well for inputting textual data such as a mouse, keyboard, stylus, voice recognition, scanner, joystick, etc. As shown in FIG. 1, the display 104 can provide a touch-screen interface such that the display 104 can act as the input device 508 as well as an output device. The input device 508 can also be connected via a wireless interface such as Bluetooth™.

The feature toolbar 114 can also be considered part of the input device 508. If an option is selected on the feature toolbar 114, the input device 508 can determine what type of option was selected and then process that option. The input device 508 can be connected to a serial input interface 510 where the input is processed and transferred over the bus 512.

With reference now to the memory 504, the collaboration appliance 100 typically includes both volatile memory, for example RAM 514, and non-volatile memory, for example ROM 516, Flash Memory, or the like. The non-volatile portion of the memory 516 can be used to store persistent information which should not be lost when the collaboration appliance 100 is powered down. Within the ROM 516, can be BIOS 518 for defining a firmware interface. Within the memory 504, the collaboration appliance 100 can include an operating system (OS) 520 stored in the RAM 514, which can manage programs. The OS 520 can reside in the memory 504 and be executed on the processor 502. An OS 520 such as Android™ or Windows 7 Mobiles can be used. Other more traditional OSs 520 can also be used by the collaboration appliance 100.

The memory 504 can also include one or more device managers 522 for interacting with one or more I/O devices. The device managers 522 can be software installed on the collaboration appliance 100. A device manager 522 can correspond to each I/O device. In addition to the device manager 522, applications 524 can be loaded into memory 204 and run on or in association with the OS 520. While described in the shown embodiment as software, the applications 524 can be implemented in software, hardware or both.

Applications 524 including Microsoft Office™ readers, a web browser, a telephony session initiation protocol (SIP) stack, a video conferencing application, etc. can be provided within memory 504, which will be described in FIG. 5. Furthermore, processing and memory required to support HD, for example 1080p×30 fps, point-to-point and bridged video conferencing and video playback capability is provided. Support is established on the collaboration appliance 100 for connection of at least one USB camera including a HD camera. Support for connection of an Ethernet HD or WiFi camera can also be provided. A USB or Bluetooth™ connected keyboard and mouse can also be supported.

While the memory 504, as shown, is provided on the collaboration appliance 100, those skilled in the relevant art will appreciate that portions of the memory 504 can be stored on a server, which can be accessed remotely. For example, the applications 524 can be accessed remotely. Those familiar with external data storage and retrieval will recognize the number of different possibilities for storing memory 504 outside the collaboration appliance 100.

The collaboration appliance 100 can have an array of microphones 528 built-in as with any standard conference phone. The collaboration appliance 100 can include many microphones 528. While three microphones 528 have been shown, sixteen microphones are generally implemented within the collaboration appliance 100. The microphones 528 can be equally spaced apart and used to capture audio from multiple directions. In one embodiment, the microphones 528 can be positioned pointing down towards the base 106 as depicted in FIG. 2B. The base 106 can direct the incoming audio to the microphones 528.

The audio from the microphones 528 can be provided to the audio mixer 532. The audio mixer 532 can be implemented in software, hardware or combination thereof. Typically, the audio mixer 532, in its hardware form, includes operational amplifiers configured with a summer circuit. In one embodiment, the output of the audio mixer 532 can be amplified using an audio amplifier. The audio mixer 532 can combine audio signal from multiple sources. The output from the audio mixer 532 can be sent to the bus 512 where it can be further processed.

Continuing with FIG. 5, the LED ring 112 can work in conjunction with the microphones 528 described above. The audio mixer, in one embodiment, can detect which microphone 528 is picking up the loudest audio. Based on that determination, the LED ring 112 can position a lighted portion 202 to point to the user who is providing the audio. The audio mixer not only detects where the audio is coming from, but also adjusts the volume for other microphones 528 on the collaboration appliance 100 to remove background noise.

The collaboration appliance 100 can further include a wireless interface 530. The wireless interface 530 can be used to search for wireless devices that are nearby. These wireless devices can be used to provide presentations or other materials that can be uploaded to the teleconference. For example, users around the collaboration appliance 100 who have a tablet or smartphone can upload a presentation to the collaboration appliance 100 through the wireless interface 530. The collaboration appliance 100 can then store the presentation in memory 504 for use when a video conference takes place. In one embodiment, to upload the presentation, an access code or password can be used.

The display 104 of the collaboration appliance 100 can be a LCD or any other type of display commonly used in conference phones. The display 104 can be connected to a display adapter 534. The display adapter 534 can receive information for display from the bus 512. In one embodiment, an HDMI port 560 can be provided. The collaboration appliance 100 can include a speaker 102, as provided earlier. The speaker 102 can propagate incoming audio received from the local area network 302 through the interface 540. These communications can then be provided over the bus 512 to the audio adapter 538.

A notification mechanism 542 can be set on the collaboration appliance 100. The notification mechanism 542 can be directly coupled to a power supply so that when activated, it remains on for a duration dictated by the notification mechanism 542 even though the processor 502 and other components might shut down to conserve energy. Examples of notification mechanisms 502 can include one or more LEDs, an audio interface, and a vibration generator.

Figure 6:
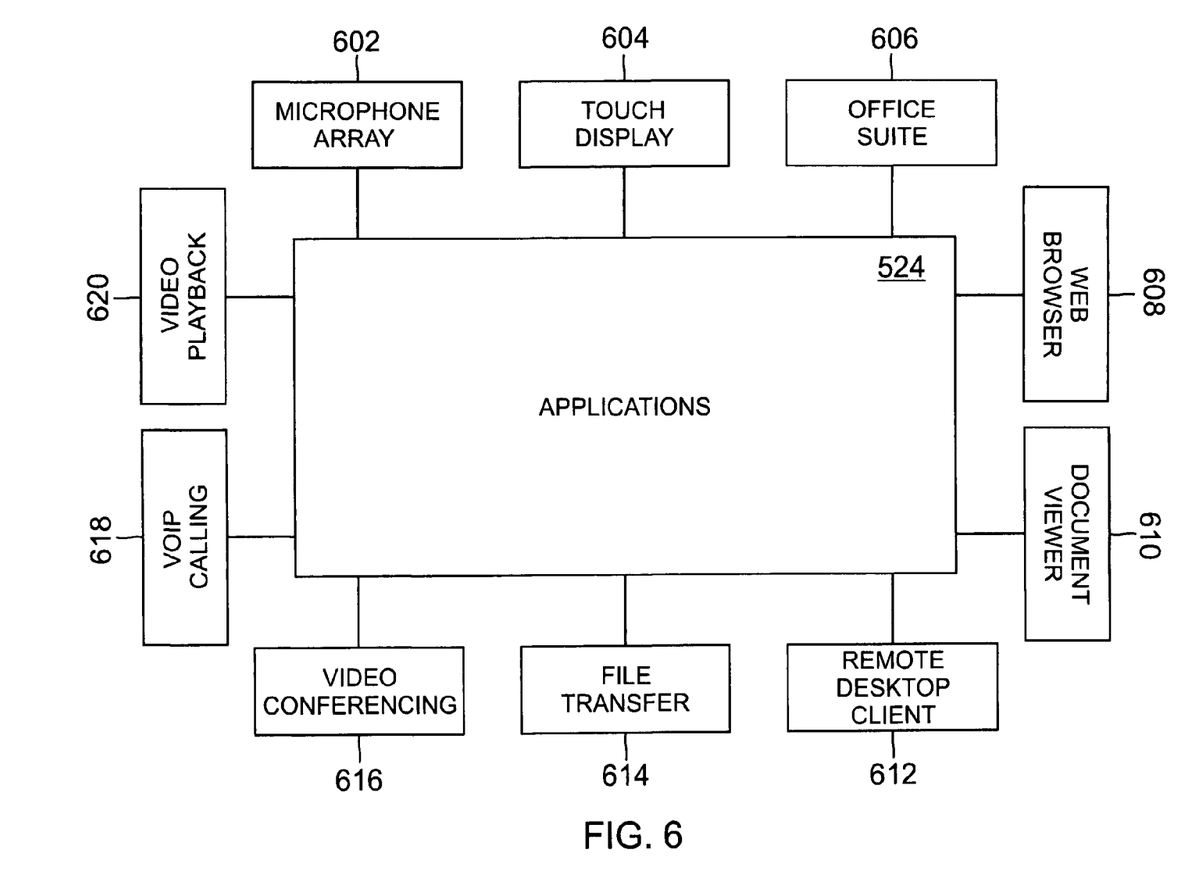
FIG. 6 is an exemplary diagram illustrating applications for use with the collaboration appliance in accordance with one aspect of the present disclosure.

FIG. 6 is an exemplary diagram illustrating applications 524 for use with the collaboration appliance 100 in accordance with one aspect of the present disclosure. The applications 524 can be provided within the volatile memory 514 or non-volatile memory 516 of the collaboration appliance 100. Fewer or more applications 524 running on top of the collaboration appliance 100 can be provided and are not limited to those shown.

In one embodiment, the collaboration appliance 100 can include a microphone array application 602. The microphone array application 602 can detect multiple audio streams and condense them into a single audio stream. The application 602 can be executed within the audio mixer 432. Through the microphones 528, audio is picked up from several sources and mixed such that it can be used or provided to other devices. The microphone array application 602 can also be used with the LED Ring 112 such that a lighted portion 202 can be calculated based on the microphone 528 that picks up the loudest audio.

A touch display application 604 can be provided on the collaboration appliance 100. The local touch screen display 104 can provide the primary GUI for accessing and launching applications on the collaboration appliance 100. The use of touch screen gestures to ease application access and navigation can be provided. Applications accessible via the desktop use the local LCD display 104 to present their GUI to users. Some application content such as presentation material and video conferencing views can be displayed on the HDMI connected display 104 as well.

Numerous other applications 524 can be provided for by the collaboration appliance 100. In one embodiment, an office suite application 606 can be established. For example, a graphical program, text program or database program can be provided for. A web browser application 608 can be established within memory 504. The application 608 can be used for retrieving, presenting and traversing information resources on the World Wide Web (WWW) or other network.

In one embodiment, a web browser application 608 can be provided on the HDMI connected display 104 for in-room participants. Multimedia content can be supported within the application 608 including hi-fidelity audio playback through the conference unit speaker 102 or HDMI connected speakers 102. HD video playback can also be provided. If the connected HDMI display 104 includes speakers 102, then the playback audio can be sent via HDMI to those speakers 102. When there are no HDMI speakers 102, the audio can be mixed onto the internal speaker 102 with the conference call audio. The presentation audio can be mixed with the conference call transmit audio, that is audio from the device's microphones 528, and played out the phone line to far end participants of the conference call.

A document viewer application 610 can also be provided by the collaboration appliance 100. Document viewers can be used to open files, but not edit them in some instances. The document viewers can be used for PDF files, spreadsheet files, text files, etc. The document viewer application 610 can provide these files to be displayed on the HDMI connected display for in-room participants in addition to the local LCD display 104.

Continuing with FIG. 6, the collaboration appliance 100 can also provide a remote desktop client application 612. The application 612 can provide the ability to set up a remote session using a remote desktop protocol (RDP), virtual network computing (VNC) or similar protocol on a user's corporate network connected PC desktop to display the session on a HDMI connected display for in-room participants. Multimedia content display within the remote desktop session can include hi-fidelity audio playback through a conference unit speaker 102 or HDMI connected speakers 102 with HD video playback supported.

A file transfer application 614 can be provided by the collaboration appliance 100. Through the local area network 302, the file transfer application 614 can transmit or receive files. In one embodiment, the application 614 can interact with a corporate directory that can be accessed using the GUI provided on the display 104. In addition, a conference control application 616 can be provided that allows the user to set up and manage an audio and video conference.

The applications 624 can also include a voice over internet protocol (VoIP) calling application 618. The application 618 can provide basic phone capabilities using industry standard VoIP protocols such as SIP or proprietary VoIP protocols. The application 618 can allow a user to make calls, receive calls, place or retrieve calls from hold, transfer callers, conference callers together, speakerphone volume adjustments, microphone mute and ringer volume adjustments. In addition, multimedia content can be supported within viewers including hi-fidelity audio playback through the conference unit speaker 102 or HDMI connected speakers 102 with HD video playback 620.

Other applications 524 that can be supported by the collaboration appliance 100 can include access to a network connected disk drive to upload a file for display. In addition, read access to a corporate telephone directory, for example, a LDAP compliant directory such as Microsoft Active Directory or Lotus Notes, read or write access to personal contacts, for example, via Microsoft Exchange™, Lotus Notes™ or similar connection displayed on a local LCD display 104, can be provided. Read or write access to a personal calendar displayed on a local LCD display 104 can be offered, for example, via Microsoft Exchange™, Lotus Notes™ or similar connection. The collaboration appliance 100 can provide the ability to dial people directly from a calendar entry that they had previously created. The user can also open any files attached to the meeting invitation and display them on the HDMI connected display 104 for in-room participants.

Read or write access to a user's personal email account can also be provided via Microsoft Exchange™, Lotus Notes™ or similar connection. In addition, read or write access to a chat application displayed on the HDMI connected display 104 can be offered. The chat client can work with the customer's instant message (IM) service, for example, Google Talk™, MSN Messenger™, Yahoo Messenger™, etc. or an in-house system such as Microsoft OCS™, IBM Sametime™ or the like can be used.

Figure 7:
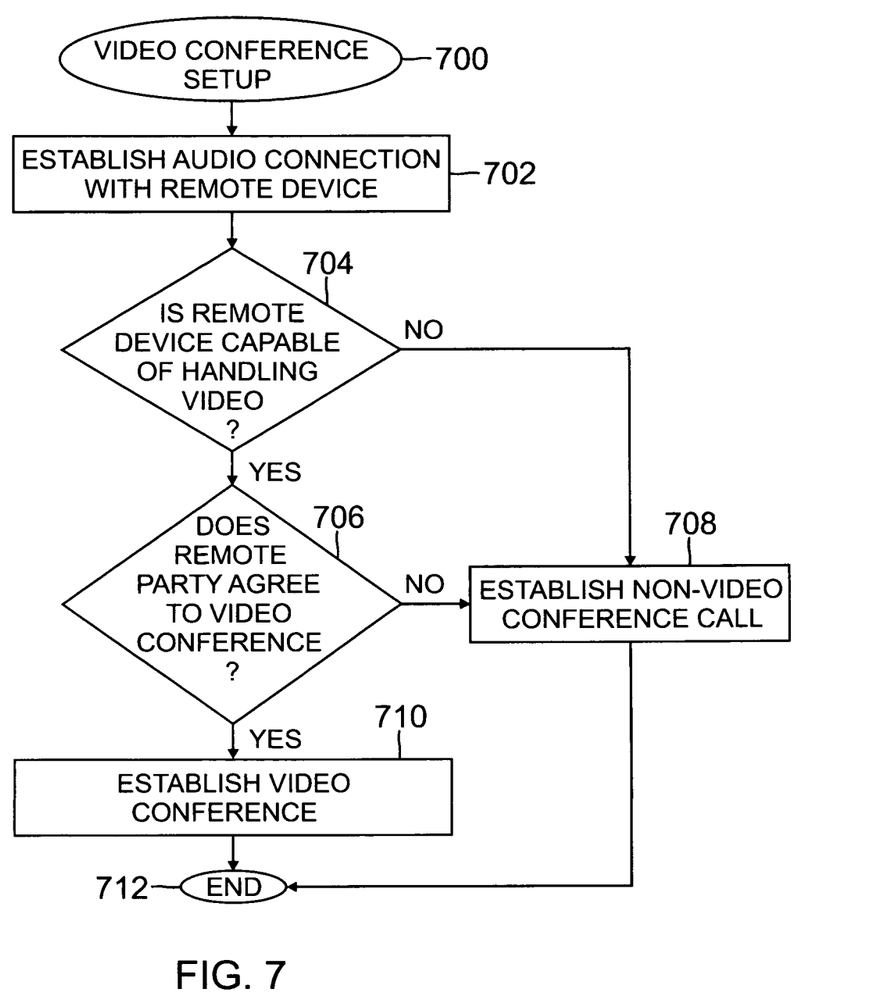
FIG. 7 is a flow chart illustrating processes for setting up a video conference in accordance with one aspect of the present disclosure.

Turning to FIG. 7, a flow chart illustrating processes for setting up a video conference in accordance with one aspect of the present disclosure is provided. The processes can begin at block 700. At block 702, the collaboration appliance 100 can establish an audio connection with a remote device by making a phone call to the remote device or receiving a phone call from the remote device. When a phone conversation is established, the collaboration appliance 100 determines via a SIP protocol whether the remote device is capable of handling video at decision block 704. An indication can be presented to the user that the telephony device at the remote end of the call is video capable.

When the remote device is not capable of handling video, the collaboration appliance 100 can indicate to the user that the remote party is only audio conference capable and establish a non-video conference call at block 708. The processes can end at block 712. If the device is found to be capable of handling video, at decision block 706, the collaboration appliance 100 can determine whether the remote party agrees to a video conference. When the remote party does not agree, a non-video conference call is established at block 708 and the processes can end at block 712.

When, however, the remote party agrees, at block 710, the collaboration appliance 100 establishes a video conference with them. The processes can end at block 712. These processes can happen each time the collaboration appliance 100 connects with a remote device.

After a video conference is established through the collaboration appliance 100, a user can choose to transmit presentation materials that are being displayed on the in-room projector or monitor to far-end video conference participants. The video feed from the in-room camera can be replaced with the presentation material such that the far end video conferencing participants are switched from seeing a video feed of the people in the room to seeing the presentation material within the video window on their video conferencing device or application.

Figure 8:
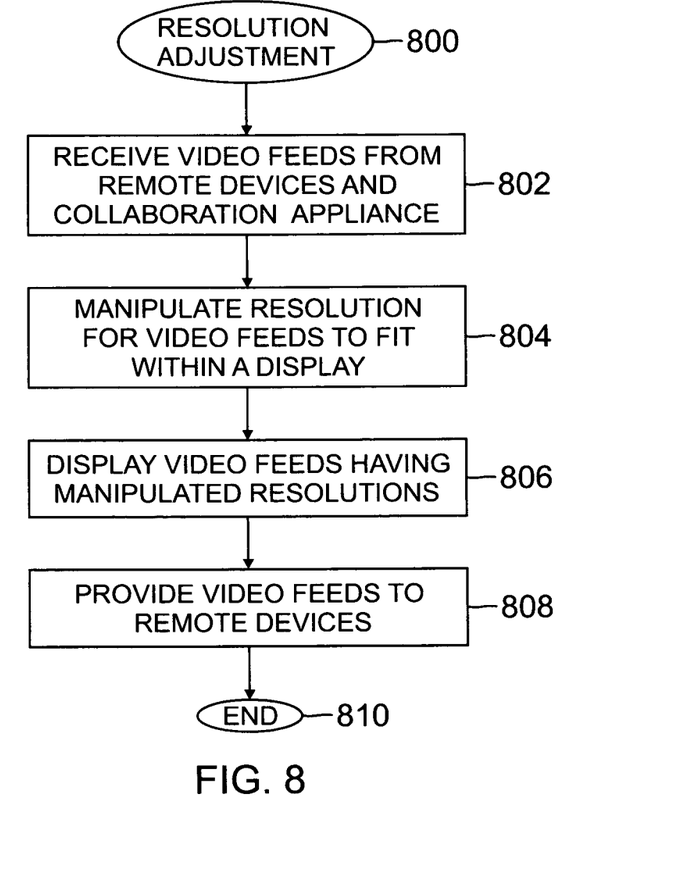
FIG. 8 is a flow chart illustrating processes for adjusting the resolution of video feeds in accordance with one aspect of the present disclosure.

Referring to FIG. 8, a flow chart illustrating processes for adjusting the resolution of video feeds in accordance with one aspect of the present disclosure is provided. The processes can be incorporated into the applications 524 presented above and begin at block 800. At block 802, the collaboration appliance 100 can receive video feeds from remote devices and the collaboration appliance 100. At block 804, the collaboration appliance 100 can manipulate the resolution for video feeds provided by the remote devices to fit within the display 104. The resolution of each video stream can be automatically adjusted up or down as windows for remote video streams are removed or added such that the windows can fit within the maximum resolution of the display 104.

At block 806, the video feeds are displayed with the manipulated resolutions. The video feeds can be provided to the remote devices at block 808. In one embodiment, the video streams from both the remote devices and the collaboration appliance 100 can be sent back to the remote parties such that each connected video party can see a video image that includes all video windows. Alternatively, the collaboration application 100 can remove the video stream provided by the remote party that sent the video stream so that the remote party does not receive back their own video stream. At block 810, the processes can end.

In addition to the video streams, the collaboration application 100 can also process audio from the multiple sources. The audio sources can be mixed on the collaboration appliance 100 such that audio from the microphones 528 are mixed or combined with audio from the remote devices. In turn, the audio can be sent to the speaker 102. The audio can also be provided to the remote devices. Audio can be removed by the collaboration appliance 100 received from a remote party when provided back to that remote party so that the audio is not duplicated on the remote device.

In one embodiment, audio from applications 524 can also be mixed with the microphone audio and sent to remote devices. For example, a web based presentation can have embedded video that includes audio. The audio can be played on the collaboration appliance 100 and far end participants can hear the audio.

Figure 9:
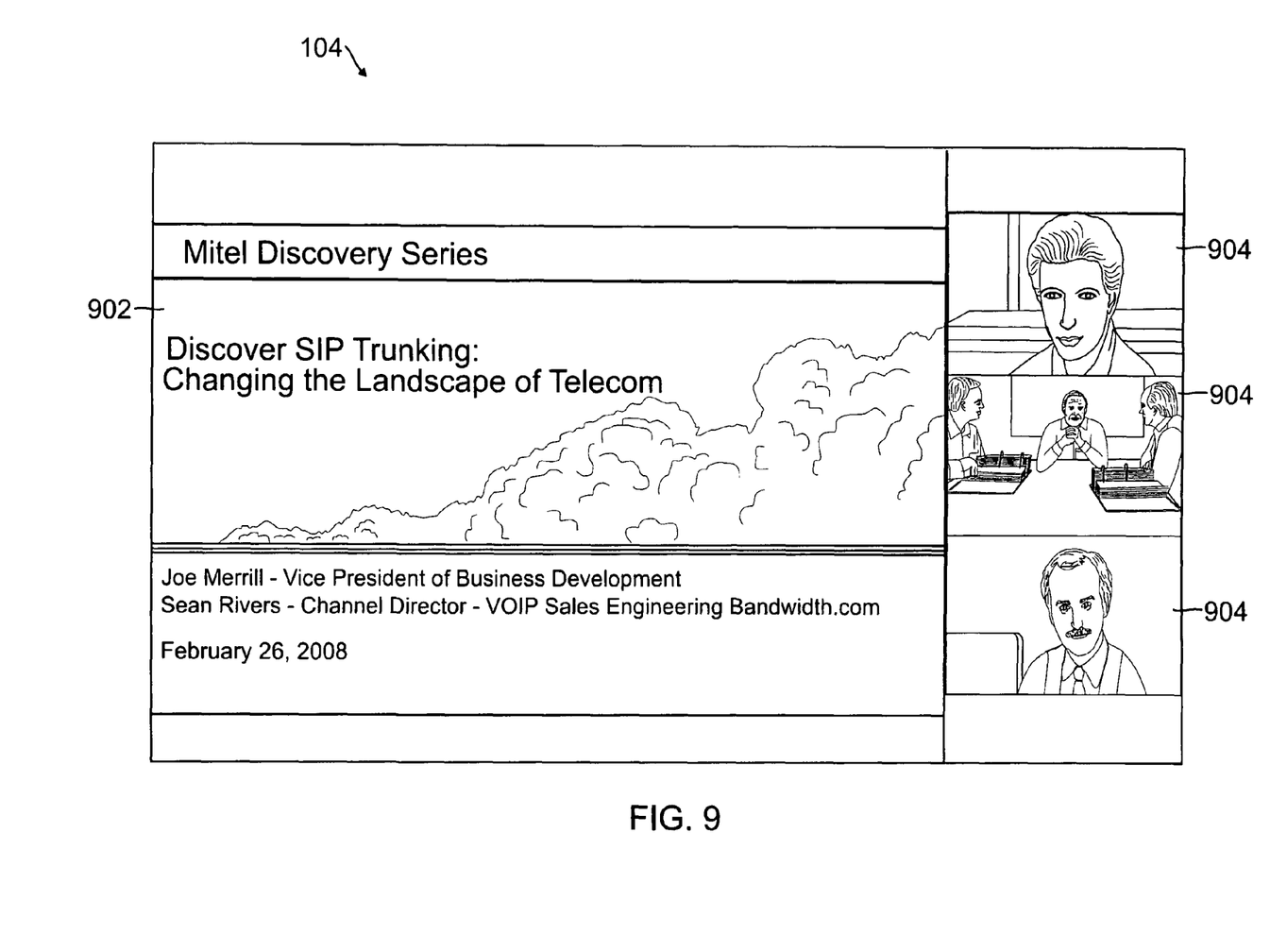
FIG. 9 is an exemplary presentation having multiple video feeds on a display of the collaboration appliance in accordance with one aspect of the present disclosure.

In one embodiment, presentations or other relevant materials can be implemented within the video feeds provided on the display 104 of the collaboration appliance 100 as well as other remote devices. FIG. 9 shows an exemplary presentation 802 having multiple video feeds 904 on a display 104 of the collaboration appliance 100 in accordance with one aspect of the present disclosure. The presentation 902 can be displayed alongside the video feeds 904. The display 104 can provide several video feeds 904 from several remote devices. For example, a video feed 904 from a user's office can be provided as well as a video feed 904 from another conference room. The presentation 902 can be retrieved through one of the many applications 524 described earlier and embedded into the display 104. In one embodiment, the presentation 902 can be displayed from Powerpoint™.

Systems, methods and operations are described below. While showing embodiments of the present disclosure, this is not intended to identify key features of the claimed subject matter, nor is it intended to be used as an aid in determining the scope of the claimed subject matter. Other embodiments of the present disclosure are described above and those presented below represent one set, but not the entire set of embodiments.

In accordance with one aspect of the present disclosure, a collaboration apparatus 100 is provided. The collaboration apparatus can include a speaker 102, a video camera, a plurality of audio receivers 528, a transfer port connected to a network 302, a display 104 having a touch screen interface, a port connected to a projector or monitor 250, at least one processor 502 and a memory 504 operatively coupled to the processor 502, the memory 504 storing program instructions that when executed by the processor 502, causes the processor 502 to perform processes.

These processes can include providing a graphical user interface on the display 104 for managing a conference, administering the conference through the touch screen interface on the display 104 using the graphical user interface, receiving pre-recorded audio and video from at least one file, receiving live audio and video through the transfer port connected to the network from at least one remote device and providing the pre-recorded audio from the at least one file and the live audio from the at least one remote device to the speaker 102. In addition, the processes can include receiving live audio from the plurality of audio receivers 528, providing the pre-recorded audio from the at least one file and the live audio from the plurality of audio receivers 528 through the transfer port connected to the network 302 to the at least one remote device and receiving live video from the video camera. The processes can also include providing the live video from the video camera and the live video from the at least one remote device and the pre-recorded video from the at least one file over the port connected to the projector or monitor 250 and providing the pre-recorded video from the at least one file and the live video from the video camera through the transfer port connected to the network 302 to the at least one remote device.

In one embodiment, the memory 504 storing program instructions, when executed by the processor 502, can cause the processor 502 to mix the live audio and video from the at least one remote device and provide the live audio and video from the at least one remote device through the transfer port connected to the network 302 to other remote devices. In one embodiment, the collaboration apparatus can include an external speaker associated with the projector or monitor 250, wherein the memory 504 storing program instructions, when executed by the processor, causes the processor to provide the pre-recorded audio from the at least one file and the live audio from the at least one remote device to the external speaker associated with the projector or monitor 250.

In one embodiment, the collaboration apparatus 100 can include at least one of a USB device interface 204, a SD card interface 206 and a Bluetooth™ wireless device interface, wherein the memory 504 storing program instructions, when executed by the processor, causes the processor to receive the at least one file through the USB device interface 204, SD card interface 206 or Bluetooth™ wireless device interface.

In one embodiment, the collaboration apparatus 100 can include a light-emitting diode ring 112, wherein the memory 504 storing program instructions, when executed by the processor 502, causes the processor 502 to illuminate a portion 202 of the light-emitting diode ring 112 in a direction where the audio from the plurality of audio receivers 528 is received.

In one embodiment, the speaker 102 can be placed in a housing portion on the collaboration apparatus 100. In one embodiment, the memory 504 storing program instructions, when executed by the processor 502, can cause the processor 502 to remove background noise from the audio received from the plurality of audio receivers 528 using a beam forming audio algorithm. In one embodiment, the memory 504 storing program instructions, when executed by the processor 502, can cause the processor 502 to open an application 524 locally to receive the pre-recorded audio and video from the at least one file.

In one embodiment, the application 524 can include at least one of a corporate telephone directory, a personal contacts directory, an office suite 606, a file browser, a web browser 608, an instant messaging client, a document viewer 610 and a remote desktop client 612. In one embodiment, the pre-recorded audio and video received from the at least one file can be retrieved through the transfer port connected to the network 302.

In accordance with another aspect of the present disclosure, a system is provided. The system can include a communication device 100 providing a multi-party video conference. By providing the multi-party video conference, the communication device 100 can live retrieve audio and video from at least one remote device, process the live audio and video along with live audio and video received by the communication device 100 and present the processed live audio and video while adjusting resolution of the processed video as new video is incorporated.

In one embodiment, providing the multi-party video conference can include transferring a presentation to the at least one remote device. In one embodiment, the communication device 100 can include a light-emitting diode ring 112 having a lighted portion 202 pointing in a direction of the audio received by the communication device 100. In one embodiment, the communication device 100 can include pre-recorded audio and video playback.

In accordance with yet another aspect of the present disclosure, a method for establishing conferences is provided. The method can include determining from input provided through a touch screen display 104 of a collaboration device 100 at least one remote device to communicate with and receiving live audio and video from the at least one remote device. In addition, the method can include incorporating the live audio from the at least one remote device with live audio received by a plurality of audio receivers 528 on the collaboration device 100 and incorporating the live video from the at least one remote device into live video received by a camera of the collaboration device 100. The method can also include providing the live audio received by the plurality of audio receivers 528, incorporating the live audio from the at least one remote device, to a speaker 102 of the collaboration device 100 and the live video received by the camera, incorporating the video from the at least one remote device, to the touch screen display 104 of the collaboration device or a connected projector or monitor 250.

In one embodiment, the method can include providing the live audio received by the plurality of audio receivers 528, incorporating the live audio from the at least one remote device, to a speaker of the at least one remote device and the live video received by the camera, incorporating the live video from the at least one remote device, to a display of the at least one remote device. In one embodiment, the method can include providing a graphical user interface on the touch screen display 104 showing at least one phone capability, the at least one phone capability comprising at least one of making calls, receiving calls, placing calls from hold, retrieving calls from hold, transferring callers, conferencing callers together, adjusting speakerphone volume, muting the at least one audio receiver and adjusting ringer volume.

In one embodiment, the method can include automatically adjusting resolution of the live video received by the camera and the live video from the at least one remote device as new live video is provided from other devices to fit within a maximum resolution of the connected projector or monitor 104. In one embodiment, the method can include performing at least one of read/write access to a network connected disk drive for uploading a file to display on the collaboration device 100, read access to a corporate telephone directory, read/write access to a personal contact, read/write access to a personal calendar, read/write access to an email account, setup of a remote desktop session and read/write access to a chat application.

The foregoing description is provided to enable any person skilled in the relevant art to practice the various embodiments described herein. Various modifications to these embodiments will be readily apparent to those skilled in the relevant art, and generic principles defined herein can be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A collaboration apparatus comprising:
   a speaker;
   a video camera;
   a plurality of audio receivers;
   a transfer port connected to a network;
   a display having a touch screen interface;
   a port connected to a projector or monitor;
   a light-emitting diode ring;
   at least one processor; and
   a memory operatively coupled to said processor, said memory storing program instructions that when executed by said processor, causes said processor to:
   provide a graphical user interface on said display for managing a conference;
   administer said conference through said touch screen interface on said display using said graphical user interface;
   receive pre-recorded audio and video from at least one file;
   receive live audio and video through said transfer port connected to said network from at least one remote device;
   provide said pre-recorded audio from said at least one file and said live audio from said at least one remote device to said speaker;
   receive live audio from said plurality of audio receivers;
   provide said pre-recorded audio from said at least one file and said live audio from said plurality of audio receivers through said transfer port connected to said network to said at least one remote device;
   receive live video from said video camera;
   provide said live video from said video camera and live video from said at least one remote device and said pre-recorded video from said at least one file over said port connected to said projector or monitor;
   provide said pre-recorded video from said at least one file and said live video from said video camera through said transfer port connected to said network to said at least one remote device;
   at a first time, illuminate a portion of said light-emitting diode ring in a direction where said audio from said plurality of audio receivers is received; and
   at a second time, illuminate at least a portion of said light-emitting diode ring in a pattern and color to indicate a call state of said collaboration apparatus.

2. The collaboration apparatus of claim 1, wherein said memory storing program instructions, when executed by said processor, causes said processor to mix said live audio and video from said at least one remote device and provide said live audio and video from said at least one remote device through said transfer port connected to said network to other remote devices.

3. The collaboration apparatus of claim 1, comprising an external speaker associated with said projector or monitor, wherein said memory storing program instructions, when executed by said processor, causes said processor to provide said audio from said at least one file and said audio from said at least one remote device to said external speaker associated with said projector or monitor.

4. The collaboration apparatus of claim 1, comprising at least one of a universal serial bus device interface, a secure digital card interface and a Bluetooth™ wireless device interface, wherein said memory storing program instructions, when executed by said processor, causes said processor to receive said at least one file through said universal serial bus device interface, secure digital card interface or Bluetooth™ wireless device interface.

5. The collaboration apparatus of claim 1, wherein said speaker is placed in a housing portion on said collaboration apparatus.

6. The collaboration apparatus of claim 1, wherein said memory storing program instructions, when executed by said processor, causes said processor to remove background noise from said audio received from said plurality of audio receivers using a beam forming audio algorithm.

7. The collaboration apparatus of claim 1, wherein said memory storing program instructions, when executed by said processor, causes said processor to open an application locally to receive said pre-recorded audio and video from said at least one file.

8. The collaboration apparatus of claim 7, wherein said application comprises at least one of a corporate telephone directory, a personal contacts directory, an office suite, a file browser, a web browser, an instant messaging client, a document viewer and a remote desktop client.

9. The collaboration apparatus of claim 1, wherein said pre-recorded audio and video received from said at least one file are retrieved through said transfer port connected to said network.

10. The collaboration apparatus of claim 1, wherein said at least one file is a presentation.

11. A system comprising:
a communication device including a light-emitting diode ring, wherein the light-emitting diode ring:
at a first time, has a lighted portion pointing in a direction of live audio; and
at a second time, has at least a portion illuminated in a pattern and color to indicate a call state of said communication device, said communication device providing a multi-party video conference;
wherein providing said multi-party video conference comprises retrieving said live audio and video from at least one remote device, processing said live audio and video along with live audio and video received by said communication device and presenting said processed live audio and video while adjusting resolution of said processed video as new video is incorporated.

12. The system of claim 11, wherein providing said multi-party video conference comprises transferring a presentation to said at least one remote device.

13. The system of claim 11, wherein said communication device includes pre-recorded audio and video playback.

14. On a collaboration device, a method for establishing conferences comprising:
determining from input provided through a touch screen display of said collaboration device at least one remote device to communicate with;
receiving live audio and video from said at least one remote device;
at a first time, pointing a lighted portion of a light-emitting diode ring in a direction of said live audio;
at a second time, illuminating at least a portion of said light-emitting diode ring in a pattern and color to indicate a call states of said collaboration device;
incorporating said live audio from said at least one remote device with live audio received by a plurality of audio receivers on said collaboration device;
incorporating said live video from said at least one remote device into live video received by a camera of said collaboration device;
providing said live audio received by said plurality of audio receivers, incorporating said live audio from said at least one remote device, to a speaker of said collaboration device and said live video received by said camera, incorporating said live video from said at least one remote device, to said touch screen display of said collaboration device or a connected projector or monitor.

15. The method of claim 14, comprising providing said live audio received by said plurality of audio receivers, incorporating said live audio from said at least one remote device, to a speaker of said at least one remote device and said live video received by said camera, incorporating said live video from said at least one remote device, to a display of said at least one remote device.

16. The method of claim 14, comprises providing a graphical user interface on said touch screen display showing at least one phone capability, said at least one phone capability comprising at least one of making calls, receiving calls, placing calls from hold, retrieving calls from hold, transferring callers, conferencing callers together, adjusting speakerphone volume, muting said at least one audio receiver and adjusting ringer volume.

17. The method of claim 14, comprising automatically adjusting resolution of said live video received by said camera and said live video from said at least one remote device as new live video is provided from other devices to fit within a maximum resolution of said connected projector or monitor.

18. The method of claim 14, comprising performing at least one of read/write access to a network connected disk drive for uploading a file to display on said collaboration device, read access to a corporate telephone directory, read/write access to a personal contact, read/write access to a personal calendar, read/write access to an email account, setup of a remote desktop session and read/write access to a chat application.

* * * * *